US008374850B2

(12) United States Patent
Assadollahi (10) Patent No.: US 8,374,850 B2
(45) Date of Patent: Feb. 12, 2013

(54) DEVICE INCORPORATING IMPROVED TEXT INPUT MECHANISM

(75) Inventor: Ramin Oliver Assadollahi, Contance (DE)

(73) Assignee: Neuer Wall Treuhand GmbH

( * ) Notice: Subject to any disclaimer, the term of this patent is extended or adjusted under 35 U.S.C. 154(b) by 0 days.

(21) Appl. No.: 13/229,769

(22) Filed: Sep. 12, 2011

(65) Prior Publication Data

US 2012/0005576 A1 Jan. 5, 2012

Related U.S. Application Data

(63) Continuation of application No. 11/131,867, filed on May 18, 2005, now Pat. No. 8,036,878.

(51) Int. Cl.
*G06F 17/27* (2006.01)
*G06F 17/28* (2006.01)
*G06F 17/21* (2006.01)
*G06F 3/048* (2006.01)
*G06F 3/00* (2006.01)

(52) U.S. Cl. ....... 704/10; 704/9; 704/4; 704/6; 715/708; 715/811; 710/67

(58) Field of Classification Search ................... 704/4, 6, 704/9, 10; 715/811, 708; 710/67
See application file for complete search history.

(56) References Cited

U.S. PATENT DOCUMENTS

| 5,109,352 A | | 4/1992 | O'Dell | |
|---|---|---|---|---|
| 5,623,406 A | * | 4/1997 | Ichbiah | ............................. 704/3 |
| 5,805,911 A | * | 9/1998 | Miller | ............................ 715/234 |
| 5,818,437 A | | 10/1998 | Grover et al. | |
| 5,945,928 A | | 8/1999 | Kushler et al. | |
| 5,952,942 A | | 9/1999 | Balakrishnan et al. | |
| 5,953,541 A | | 9/1999 | King et al. | |
| 5,963,671 A | * | 10/1999 | Comerford et al. | ........... 382/230 |
| 6,005,495 A | | 12/1999 | Connolly | |
| 6,005,498 A | | 12/1999 | Yang et al. | |
| 6,011,554 A | * | 1/2000 | King et al. | .................... 715/811 |
| 6,219,731 B1 | | 4/2001 | Gutowitz | |

(Continued)

FOREIGN PATENT DOCUMENTS

| CA | 2601859 | 6/2000 |
|---|---|---|
| CA | 2547143 | 11/2006 |

(Continued)

OTHER PUBLICATIONS

Dunlop, M.D. & Crossan, A. Predictive text entry methods for mobile phones. Personal Technologies 4, 134-143 (2000).*

(Continued)

*Primary Examiner* — Edgar Guerra-Erazo
(74) *Attorney, Agent, or Firm* — Alston & Bird LLP (57) ABSTRACT

A device including a display screen for displaying m-words of data, a text entry device for entering data, a processor receiving data from the text entry device and causing it to be displayed on the display screen. Upon activation the processor initializes a precursor to a predefined value. The device further includes a non-volatile memory storing a dictionary containing a plurality of entries, each entry including an index, a candidate word, and a score. The processor selects a list of n-number of candidate words from the dictionary whose index matches the precursor, and causes m-number of candidate words from the list of candidate words to be displayed on the display screen. The processor causes the display to prompt the user to select one of the displayed candidate words or enter a desired word using the text entry device.

27 Claims, 5 Drawing Sheets

U.S. PATENT DOCUMENTS

| | | | |
|---|---|---|---|
| 6,223,059 B1* | 4/2001 | Haestrup | 455/566 |
| 6,286,064 B1 | 9/2001 | King et al. | |
| 6,307,548 B1 | 10/2001 | Flinchem et al. | |
| 6,307,549 B1 | 10/2001 | King et al. | |
| 6,362,752 B1 | 3/2002 | Guo et al. | |
| 6,377,965 B1* | 4/2002 | Hachamovitch et al. | 715/203 |
| 6,405,060 B1 | 6/2002 | Schroeder et al. | |
| 6,473,006 B1 | 10/2002 | Yu et al. | |
| 6,636,162 B1 | 10/2003 | Kushler et al. | |
| 6,646,573 B1 | 11/2003 | Kushler et al. | |
| 6,712,534 B2 | 3/2004 | Patel | |
| 6,766,179 B1 | 7/2004 | Shiau et al. | |
| 6,955,602 B2 | 10/2005 | Williams | |
| 7,075,520 B2 | 7/2006 | Williams | |
| 7,103,852 B2* | 9/2006 | Kairis, Jr. | 715/800 |
| 7,111,248 B2 | 9/2006 | Mulvey | |
| 7,286,115 B2 | 10/2007 | Longe et al. | |
| 7,296,021 B2 | 11/2007 | Malkin et al. | |
| 7,319,957 B2 | 1/2008 | Robinson | |
| 7,395,203 B2 | 7/2008 | Wu et al. | |
| 7,443,316 B2* | 10/2008 | Lim | 341/22 |
| 7,461,059 B2 | 12/2008 | Richardson et al. | |
| 7,475,072 B1 | 1/2009 | Ershov | |
| 7,480,619 B1 | 1/2009 | Scott | |
| 7,487,145 B1 | 2/2009 | Gibbs et al. | |
| 7,580,829 B2 | 8/2009 | James | |
| 7,580,925 B2 | 8/2009 | Unruh | |
| 7,587,378 B2 | 9/2009 | Van Meurs | |
| 7,610,194 B2 | 10/2009 | Bradford | |
| 7,617,200 B2 | 11/2009 | Budzik et al. | |
| 7,679,534 B2 | 3/2010 | Kay | |
| 7,712,053 B2 | 5/2010 | Bradford et al. | |
| 7,720,682 B2 | 5/2010 | Stephanick | |
| 7,725,485 B1 | 5/2010 | Sahami et al. | |
| 7,750,891 B2 | 7/2010 | Stephanick et al. | |
| 7,840,579 B2 | 11/2010 | Samuelson | |
| 7,840,770 B2 | 11/2010 | Larson | |
| 8,036,878 B2 | 10/2011 | Assadollahi | |
| 8,117,540 B2 | 2/2012 | Assadollahi | |
| 2002/0021311 A1 | 2/2002 | Shechter | |
| 2002/0075323 A1 | 6/2002 | O'Dell | |
| 2002/0078106 A1 | 6/2002 | Carew et al. | |
| 2002/0126097 A1 | 9/2002 | Savolainen | |
| 2002/0152203 A1 | 10/2002 | Ostergaard | |
| 2002/0163504 A1 | 11/2002 | Pallakoff | |
| 2002/0180689 A1 | 12/2002 | Venolia | |
| 2002/0196163 A1 | 12/2002 | Bradford | |
| 2003/0011574 A1 | 1/2003 | Goodman | |
| 2003/0023420 A1 | 1/2003 | Goodman | |
| 2003/0023426 A1 | 1/2003 | Pun et al. | |
| 2003/0030573 A1 | 2/2003 | Ure | |
| 2003/0054830 A1 | 3/2003 | Williams et al. | |
| 2003/0064686 A1 | 4/2003 | Thomason et al. | |
| 2003/0097252 A1 | 5/2003 | Mackie | |
| 2003/0104839 A1 | 6/2003 | Kraft et al. | |
| 2003/0107555 A1 | 6/2003 | Williams | |
| 2003/0144830 A1 | 7/2003 | Williams | |
| 2004/0017946 A1 | 1/2004 | Longe et al. | |
| 2004/0024584 A1 | 2/2004 | Brill | |
| 2004/0056844 A1 | 3/2004 | Gutowitz | |
| 2004/0070567 A1 | 4/2004 | Longe et al. | |
| 2004/0095327 A1* | 5/2004 | Lo | 345/169 |
| 2004/0122979 A1* | 6/2004 | Kirkland | 709/247 |
| 2004/0140956 A1 | 7/2004 | Kushler | |
| 2004/0153963 A1 | 8/2004 | Simpson | |
| 2004/0153975 A1 | 8/2004 | Williams et al. | |
| 2004/0160419 A1* | 8/2004 | Padgitt | 345/173 |
| 2004/0176114 A1 | 9/2004 | Northcutt | |
| 2005/0017954 A1 | 1/2005 | Kay | |
| 2005/0043949 A1 | 2/2005 | Roth et al. | |
| 2005/0060448 A1 | 3/2005 | Gutowitz | |
| 2005/0114770 A1 | 5/2005 | Sacher | |
| 2005/0188330 A1 | 8/2005 | Griffin | |
| 2005/0192802 A1 | 9/2005 | Robinson et al. | |
| 2005/0240391 A1* | 10/2005 | Lekutai | 704/2 |
| 2005/0283358 A1 | 12/2005 | Stephanick et al. | |
| 2005/0283364 A1 | 12/2005 | Longe et al. | |
| 2006/0013487 A1 | 1/2006 | Longe et al. | |
| 2006/0018545 A1 | 1/2006 | Zhang et al. | |
| 2006/0025091 A1 | 2/2006 | Buford | |
| 2006/0123354 A1 | 6/2006 | Volovitz | |
| 2006/0136408 A1 | 6/2006 | Weir et al. | |
| 2006/0158436 A1 | 7/2006 | LaPointe et al. | |
| 2006/0167689 A1 | 7/2006 | Maren | |
| 2006/0167872 A1 | 7/2006 | Parikh | |
| 2006/0173807 A1 | 8/2006 | Weir et al. | |
| 2006/0190256 A1 | 8/2006 | Stephanick et al. | |
| 2006/0190447 A1 | 8/2006 | Harmon | |
| 2006/0236239 A1 | 10/2006 | Simpson et al. | |
| 2006/0242576 A1 | 10/2006 | Nagel et al. | |
| 2006/0247915 A1 | 11/2006 | Bradford | |
| 2006/0256139 A1 | 11/2006 | Gikandi | |
| 2006/0259479 A1 | 11/2006 | Dai | |
| 2006/0265208 A1 | 11/2006 | Assadollahi | |
| 2007/0030249 A1 | 2/2007 | Griffin et al. | |
| 2007/0074131 A1 | 3/2007 | Assadollahi | |
| 2007/0075915 A1 | 4/2007 | Cheon et al. | |
| 2007/0076862 A1 | 4/2007 | Chatterjee et al. | |
| 2007/0094718 A1 | 4/2007 | Simpson | |
| 2007/0106785 A1 | 5/2007 | Tandon | |
| 2007/0203879 A1 | 8/2007 | Templeton-Steadman et al. | |
| 2007/0205983 A1 | 9/2007 | Naimo | |
| 2007/0216651 A1 | 9/2007 | Patel | |
| 2007/0226649 A1 | 9/2007 | Agmon | |
| 2007/0268264 A1 | 11/2007 | Aarras et al. | |
| 2007/0285397 A1 | 12/2007 | LaPointe et al. | |
| 2008/0034081 A1 | 2/2008 | Marshall et al. | |
| 2008/0072143 A1 | 3/2008 | Assadollahi | |
| 2008/0072145 A1 | 3/2008 | Blanchard et al. | |
| 2008/0076472 A1 | 3/2008 | Hyatt | |
| 2008/0138135 A1 | 6/2008 | Gutowitz | |
| 2008/0154576 A1 | 6/2008 | Wu et al. | |
| 2008/0159841 A1 | 7/2008 | Keller | |
| 2008/0189605 A1 | 8/2008 | Kay et al. | |
| 2008/0195388 A1 | 8/2008 | Bower et al. | |
| 2008/0235003 A1 | 9/2008 | Lai et al. | |
| 2008/0244446 A1 | 10/2008 | LeFevre et al. | |
| 2008/0263015 A1 | 10/2008 | Qiu et al. | |
| 2008/0266263 A1 | 10/2008 | Motaparti et al. | |
| 2008/0288665 A1 | 11/2008 | Williams | |
| 2008/0291059 A1 | 11/2008 | Longe | |
| 2009/0019002 A1 | 1/2009 | Boulis | |
| 2009/0037371 A1 | 2/2009 | Unruh et al. | |
| 2009/0055732 A1 | 2/2009 | Motaparti et al. | |
| 2009/0077037 A1 | 3/2009 | Wu et al. | |
| 2009/0092323 A1 | 4/2009 | Qiu et al. | |
| 2009/0150383 A1 | 6/2009 | Qiu et al. | |
| 2009/0154682 A1 | 6/2009 | Qiu | |
| 2009/0192786 A1 | 7/2009 | Assadollahi | |
| 2009/0193334 A1 | 7/2009 | Assadollahi | |
| 2009/0306969 A1 | 12/2009 | Goud et al. | |
| 2010/0121876 A1 | 5/2010 | Simpson et al. | |
| 2010/0122164 A1 | 5/2010 | Kay et al. | |
| 2010/0161538 A1 | 6/2010 | Kennedy | |
| 2010/0174529 A1 | 7/2010 | Bradford et al. | |
| 2010/0188338 A1 | 7/2010 | Longe | |
| 2010/0228710 A1 | 9/2010 | Imig et al. | |
| 2010/0277416 A1 | 11/2010 | Longe et al. | |
| 2011/0071834 A1* | 3/2011 | Kristensson et al. | 704/251 |
| 2011/0197128 A1 | 8/2011 | Assadollahi | |
| 2011/0197152 A1 | 8/2011 | Assadollahi | |

FOREIGN PATENT DOCUMENTS

| | | |
|---|---|---|
| EP | 0 858 023 A2 | 8/1998 |
| EP | 0930760 | 7/1999 |
| EP | 1347361 | 9/2003 |
| EP | 1724692 | 11/2006 |
| GB | 2399202 | 9/2004 |
| WO | 02091160 | 11/2002 |
| WO | 2005036413 | 4/2005 |
| WO | 2006080927 | 8/2006 |
| WO | 2006080935 | 8/2006 |
| WO | 2008034112 | 3/2008 |
| WO | WO 2008/030563 A2 | 3/2008 |

OTHER PUBLICATIONS

Schneider-Hufschmidt, Matthias, Usability Issues of Sending Text

Messages, The Kluwer International Series on Computer Supported Cooperative Work, vol. 4, No. 5, pp. 223-236, 2005.*

B. Y.-L. Kuo et al.; "Tag Clouds for Summarizing ~~eb Search Results" W\~t~ Conference 2007, [Online] May 8-12, 2007 XP002496297 Banff, Alberta, Canada.

Berhard D.: ~Multilingual tern extraction 1,6,7 from domain-specific corpora uS'j ng morphological structure 11th Conference of the European Chapter of the Association for Computational.

iHEARST M.A , Rosner D.: RTag Clouds 1,6,7 !Data Analysis Tool or Social Signaller?!<;+St Annual Hawaii Internationat\L !Conference on System Science, [Online] !Jan. 7-10, 2008.

Assadollahi, R; Pulvermu, Iler; 2003, Early Influences of Word Length and Frequency: A Group Study Using MEG NeuoReport 14, 1183-1187.

Sam A. Inverso, Nick Hawes, John Kelleher, Rebecca Allen and Ken Haase "Think and Spell: Context-Sensitive Predictive Text for an Ambiguous Keyboard Brain-Computer Interface Speller" Biomedzinische Technik, [online] D vol. 49, No. 1 Sep. 2004.

Tom Stocky, Alexander Faaborg, Henry Lieberman "A Commonsense Approach to Predictive Text Entry" Proceedings of Conference on Human Factors.

Pereira et al., Beyond word N-grams. In David Yarovsky and Kenneth Church, editors, Proceedings of the Third Workshop on Very Large Corpora, pp. 95-106, Somerset, New Jersey, 1995.

Berard C., Neimeijer D. Evaluating effort reduction through different word prediction systems. Proceedings of the IEEE International Conference on Systems, Man and Cybernetics, La Haye NL. vol. 3, pp. 2658-2663. Oct. 2004.

Jones, P. E., Virtual keyboard with scanning and augmented by prediction, Proc 2nd European Conference on Disability, Virtual Reality and Associated Technologies, (University of Reading, UK, 1998),45-51.

Hollis Weber, "Taming Microsoft Word 2002", 122 Pages, published on Oct. 10, 2002.

Potipiti, T., Sornlertlamvanich, V., & Thanadkran, K. (2001). Towards an intelligent multilingual keyboard system. Paper presented at the Human Language Technology Conference (HLT 2001), Mar. 18-21, 2001, San Diego.

Office Action for U.S. Appl. No. 11/131,867 dated Apr. 2, 2008.
Office Action for U.S. Appl. No. 11/131,867 dated Jan. 16, 2009.
Office Action for U.S. Appl. No. 11/131,867 dated Aug. 19, 2009.
Office Action for U.S. Appl. No. 11/131,867 dated Dec. 2, 2010.
Notice of Allowance for U.S. Appl. No. 11/131,867 dated Jun. 29, 2011.
Office Action for U.S. Appl. No. 11/550,668 dated Dec. 29, 2008.
Office Action for U.S. Appl. No. 11/550,668 dated Apr. 29, 2009.
Office Action for U.S. Appl. No. 11/550,668 dated Apr. 22, 2010.
Notice of Allowance for Appl. No. 11/550,668 dated Aug. 16, 2010.
Office Action for U.S. Appl. No. 12/181,273 dated Jul. 20, 2011.
Office Action for U.S. Appl. No. 12/181,273 dated Nov. 23, 2011.
Notice of Allowance for U.S. Appl. No. 12/181,273 dated May 22, 2012.
Office Action for U.S. Appl. No. 11/940,400 dated Oct. 4, 2010.
Office Action for U.S. Appl. No. 11/940,400 dated Jul. 12, 2011.
Notice of Allowance for U.S. Appl. No. 11/940,400 dated Nov. 2, 2011.
Office Action for U.S. Appl. No. 12/416,891 dated Jun. 23, 2011.
Office Action for U.S. Appl. No. 12/416,891 dated Nov. 22, 2011.
Search Report for EP Application No. 06 024049.6.
U.S. Appl. No. 11/470,579.
Forney, Jr., G. D., *The Viterbi Algorithm*, Proceedings of the IEEE, 1973K, pp. 268-278.
Kashyap et al., *Spelling Correction Using Probabillistic Methods*, Mar. 1984, pp. 147-154.
Mankoff, J. et al., *Cirrin: A Word-Level Unistroke Keyboard for Pen Input*, Proceedings of UIST, Technical Note (1998) 213-214.

\* cited by examiner

| TABLE 1 | | | | |
|---|---|---|---|---|
| Word | Frequency | | Word | Frequency |
| . | 4 | | mat | 1 |
| The | 3 | | dog | 2 |
| cat | 2 | | came | 1 |
| sat | 1 | | along | 1 |
| on | 1 | | chased | 1 |
| the | 2 | | | |

FIG. 5

| TABLE 2 | | | | |
|---|---|---|---|---|
| Words | Frequency | | Words | Frequency |
| The | 3 | | dog came | 1 |
| The cat | 1 | | came along | 1 |
| cat sat | 1 | | along . | 1 |
| sat on | 1 | | dog chased | 1 |
| on the | 1 | | chased the | 1 |
| the mat | 1 | | the cat | 1 |
| mat | 1 | | cat . | 1 |
| The dog | 2 | | | |

FIG. 6

| TABLE 3 | |
|---|---|
| Word | Frequency |
| . | 4/19 = 0.21 |
| The | 3/19 = 0.15 |
| cat | 2/19 = 0.10 |
| sat | 1/19 = 0.05 |
| on | 1/19 = 0.05 |
| the | 2/19 = 0.10 |
| mat | 1/19 = 0.05 |
| dog | 2/19 = 0.10 |
| came | 1/19 = 0.05 |
| along | 1/19 = 0.05 |
| chased | 1/19 = 0.05 |

FIG. 7

| TABLE 4 | |
|---|---|
| Word | Category |
| The, the, a | DETERMINER |
| little, red | ADJECTIVE |
| girl, car | NOUN |
| sat, drove | VERB |

FIG. 8

| TABLE 5 | | |
|---|---|---|
| Precursor | Candidate | Frequency |
| DETERMINER ADJECTIVE | NOUN | 1 |
| DETERMINER | NOUN | 5 |
| NOUN | VERB | 4 |
| DETERMINER NOUN | VERB | 2 |

DEVICE INCORPORATING IMPROVED TEXT INPUT MECHANISM

FIELD OF THE INVENTION

The present invention relates to a device incorporating an improved text input mechanism, a method for improved text input and a computer program for performing the method. More particularly, the present invention relates to a device such as a personal digital assistant or cellular telephone which incorporates a method for contextual prediction of the next word of text to be input. The method of the present invention minimizes the number of keystrokes necessary to input text.

BACKGROUND OF THE INVENTION

The use of miniature computers such as personal digital assistants (PDA) and cellular devices capable of text messaging has become increasingly popular. Such miniature devices include correspondingly miniature sized input mechanisms. Typically PDA's and the like utilize a miniature keyboard or a multi-tap data entry mechanism. The miniature size of the input mechanism makes it impractical to enter large amounts of text, and it is desirable to minimize the number of keystrokes necessary to enter text.

Prior approaches for minimizing the number of keystrokes have focused on so-called disambiguating methods in which the system refines its guess of the text being entered as the user enters each letter of text. U.S. Pat. Nos. 5,818,437, 5,953,541 and U.S. patent publication numbers 20020152203, 20020163504, and 20020126097 are representative of the state of the prior art.

The prior art approach is akin to thumbing through a dictionary. The system "flips" to the appropriate section of the dictionary once the initial letter is entered, and displays words beginning with the initial letter. Due to limitations in the size of the display, only the first n words are displayed. If the desired word happens to occur within the first n words then the user may select the desired word from the list of n words.

If the desired word does not appear, then the user enters the second letter, whereupon the system displays words beginning with the first two letters. If the desired word occurs within the displayed list of n words then the user may select the desired word from the list.

If the desired word does not appear, then the user then enters the third letter, whereupon the system displays words beginning with the first three letters. The user continues to enter letters until either the desired word is displayed in the list of n words or the word is fully entered.

The aforementioned approach has not sufficiently reduced the number of keystrokes. Accordingly, what is needed is an improved method for reducing the number of keystrokes necessary to enter text.

SUMMARY OF THE INVENTION

Disclosed is a device incorporating a predictive text entry mechanism, a predictive text input method and a computer program for performing the method. The device includes a display screen for displaying m-words of data, a text entry device for entering data, a processor receiving data from the text entry device and causing it to be displayed on the display screen, wherein upon activation said processor initializes a precursor to a predefined value. The device is provided with a non-volatile memory storing a dictionary containing a plurality of entries, each such entry including an index, a candidate word, and a score. The processor selecting a list of n-number of candidate words from the dictionary whose index matches the precursor (i.e. the context). The processor causing m-number of candidate words from the list of candidate words to be displayed on the display screen. The processor causing the display to prompt the user to select one of the displayed candidate words or enter a desired word using said text entry device.

In response to the selection of a candidate word, the processor updates the precursor appending the selected candidate word to the end of the precursor, deleting the leading word, selecting a new list of candidate words whose index word matches the precursor, and causing the display to prompt the user to either select one of the displayed candidate words or enter a desired word using the text entry device.

DETAILED DESCRIPTION OF THE PREFERRED EMBODIMENTS

The present invention provides an efficient method for inputting text, and is particularly suited for cellular telephones, handheld computers such as personal digital assistants, and other devices requiring data entry.

The present invention is indifferent to the specific method for inputting text. Text may be entered using a keyboard, a virtual keyboard such as a touch screen, a so-called Graffiti style of writing popularized by the PALM® operating system, or any other man-machine interface.

The basic concept underlying the present invention is that the next item of text is predicted based on the preceding word or words of text. Furthermore, non-linguistic contexts (such as the identification of a text field as "address field") may be used to predict words.

According to a first embodiment, the system provides a list of candidate words for the next word of text based on the preceding word or delimiter. However, as will be explained below, the present invention may readily be adapted to predict the next word based on any combination of preceding words or delimiters and/or linguistic analysis thereof.

Figure 1:
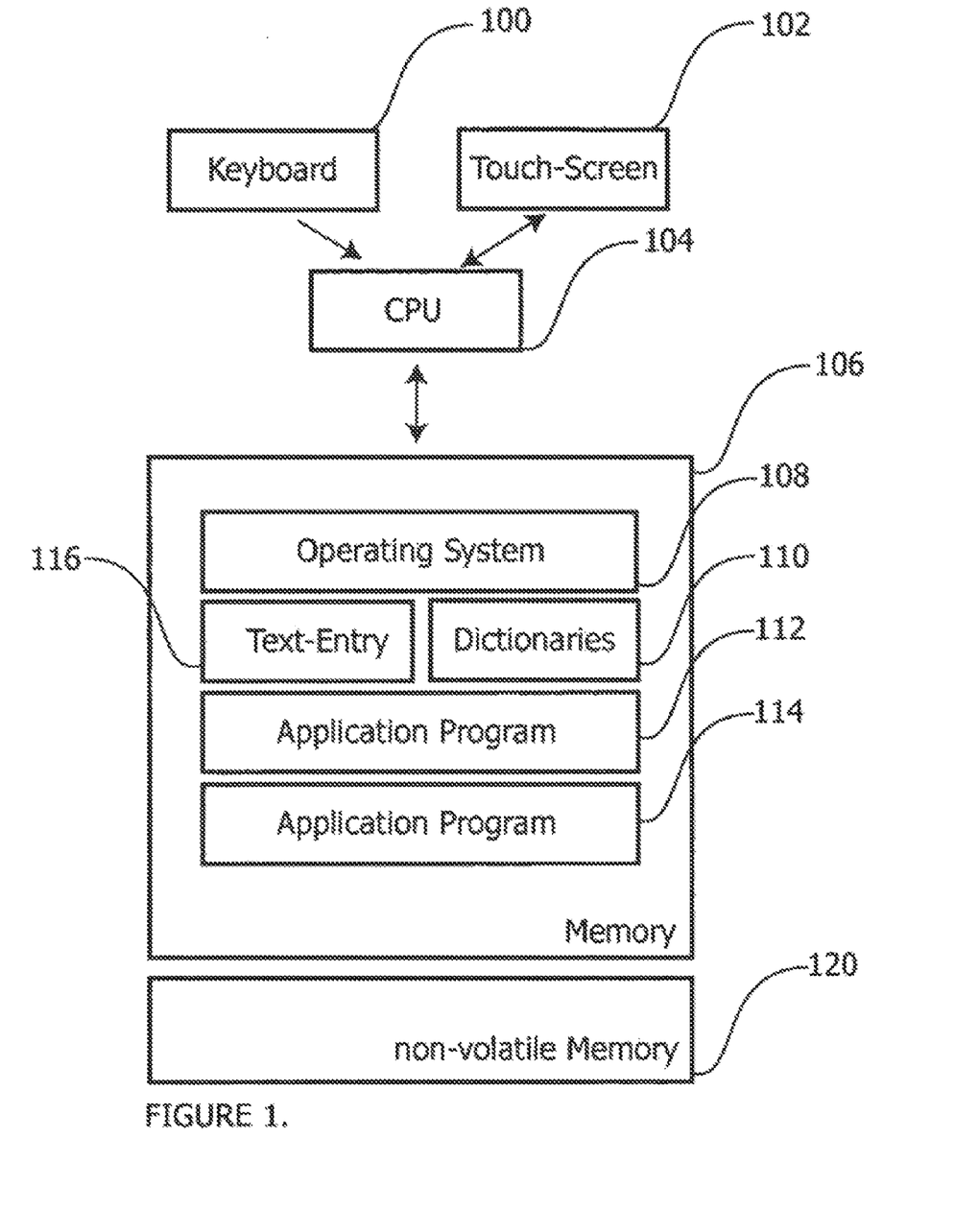
FIG. 1 is a block diagram of a device including the predictive data entry mechanism of the present invention.

FIG. 1 is a block diagram of the operating environment of the present invention.

The system 10 of the present invention includes an input device 100 which may be a keypad, keyboard, touch sensitive screen or the like which hereinafter will be referred to as keyboard 100. The system 10 further includes a display 102 for displaying the text entered as well as an m word list of predicted words, the screen may be an LCD screen or the like, and in the case of a touch sensitive screen the display 102 may serve a dual purpose both as a display and as the keyboard 100.

The present invention will work with any means for inputting text, and any means for displaying text.

As further illustrated in FIG. 1, the system 10 includes a processor or central processing unit (CPU) 104 which executes commands via an operating system 108. The system 10 may include a plurality of application programs 112, an application for decoding handwriting into text 116, an application which displays text 114 and one or more dictionaries 110.

It should be appreciated that the text recognition application 116, the display application 114, and one or more of the dictionaries 110 may be implemented as firmware or microcode stored on a non-volatile memory 120 such as an EPROM, EEPROM or the like. Use of the term "software" throughout this disclosure should be interpreted to include software implemented through firmware and stored on a non-volatile memory medium.

The present system is realized as software or firmware or the like, architecturally located between the operating system 108 of the computer 104 and the application 112 that receives text as input, e.g. a word processor.

The system 10 is language specific and has one or more dictionaries or vocabulary modules. The dictionary 110 and keyboard 100 are language specific. However, the software may allow for switching dictionaries and thus switching languages.

A key aspect of the invention relates to its ability to predict the next word the user will input based on the preceding words or delimiters which will hereinafter be referred to as the context or precursor. It is notable, that the context may also arise from the type of application receiving the text or the type of text field receiving the text. In the first case, the application may give a hint to what kind of style the user will use (SMS, short message service: colloquial writing vs. word processor: formal writing). In the second case, some operating systems assign unique identifiers to certain text fields such as "name", "address", etc. This information may be used to activate a different dictionary containing all names, addresses, cities etc.

The system 10 predicts the next word the user will enter based on the context, and displays a list of candidate words. The number of candidate words displayed is dependent upon the size and resolution of the display (the screen's real estate), and the font size in which the text is displayed. Moreover, the system 10 may optionally be configured to only display candidate words whose score exceeds a threshold value, further limiting the number of candidate words displayed.

Figure 2:
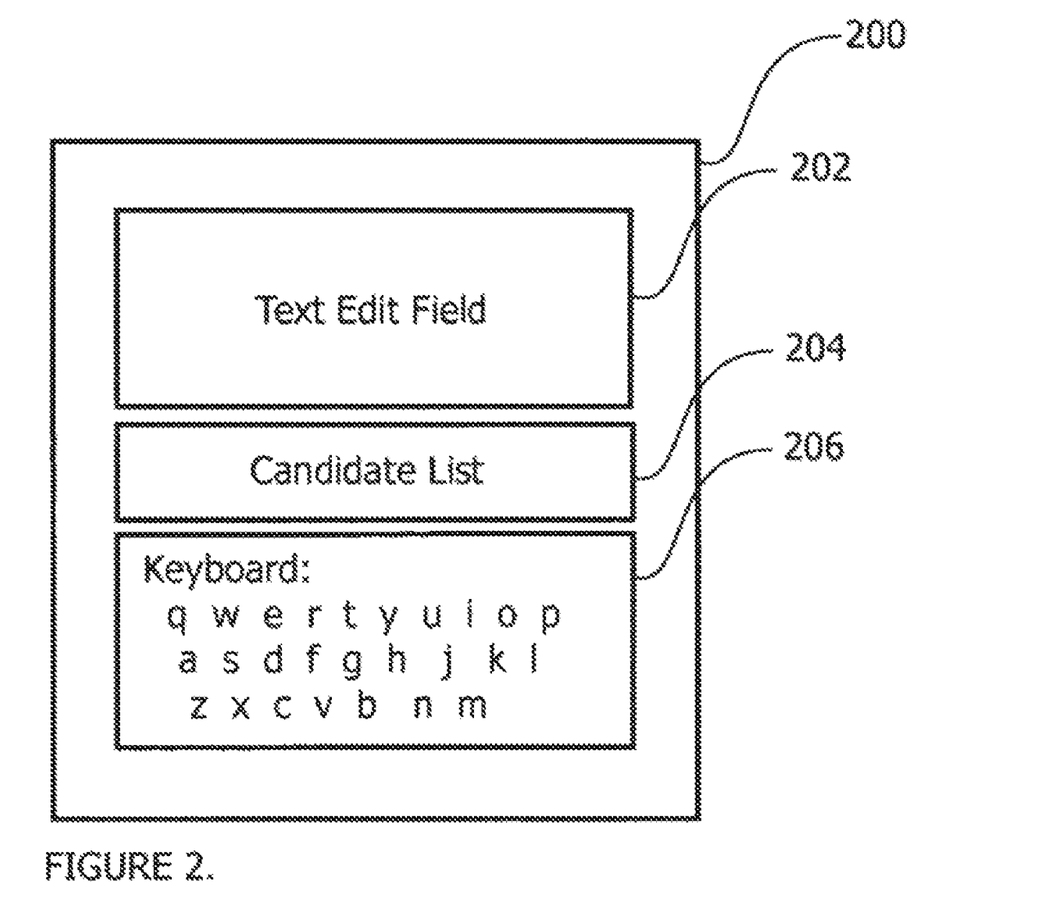
FIG. 2 shows a sample device including the predictive data entry mechanism of the present invention.

FIG. 2 is a block diagram of an illustrative device 200 employing the system 10 of the present invention.

The device 200 includes display having a text edit field 202 showing a text string entered or selected by the user. The display further includes a field 204 displaying a list of candidate words, and optionally a field 206 displaying a virtual keyboard.

Figure 3:
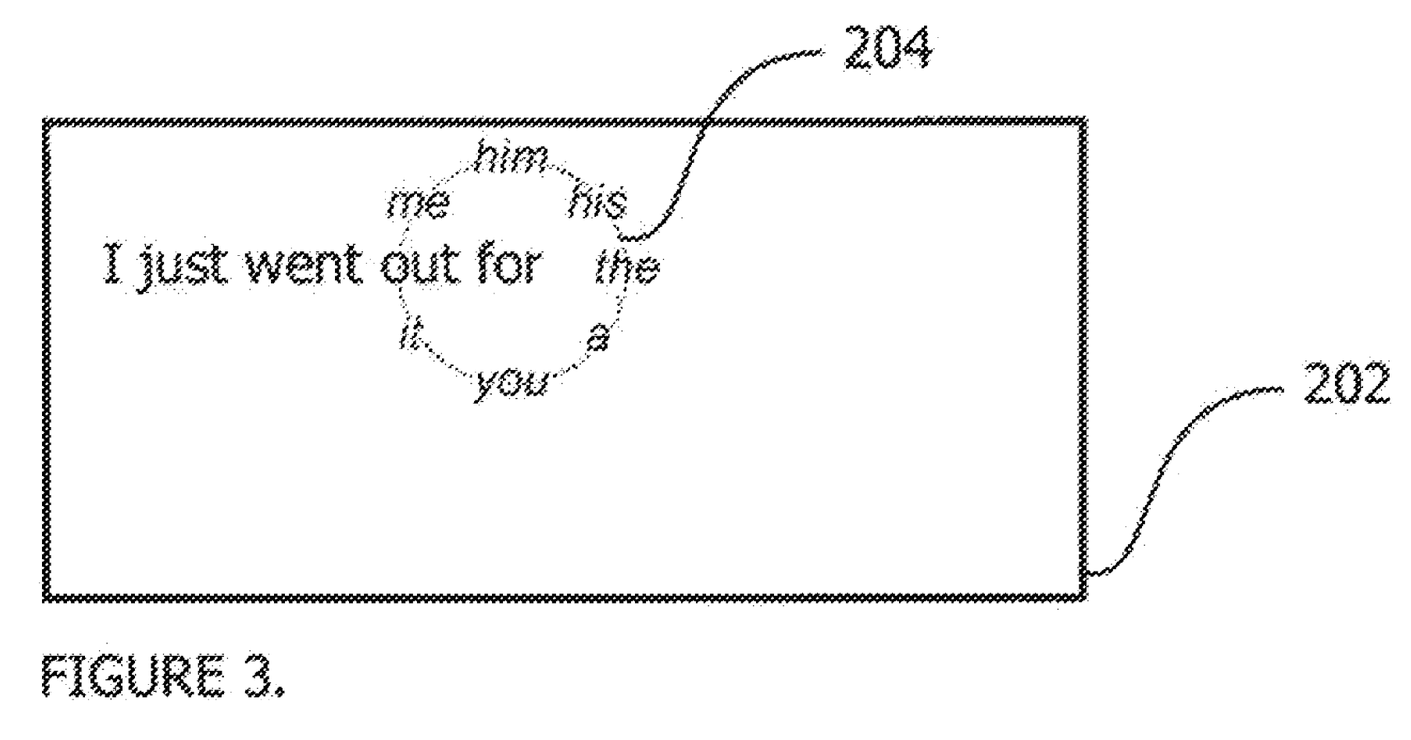
FIG. 3 shows one method of displaying candidate words.

It is important to note, that the list 204 may take different forms of presentation. For example, it may be realised as a circle on which the words are presented. This is illustrated in FIG. 3. This circle 204 may follow the position in the text where the current input is directed to (this is called cursor which usually takes the visual form of a blinking vertical bar). For the sake of simplicity, the structure that is presented to the user will be termed "list" in the following.

One of the important aspects of the invention is that the list of candidate words is context dependent. The system 10 selects candidate words by looking at the immediately preceding word or words which will be termed a precursor. The number of words defining a precursor may vary. It should be understood that the term "word" as used throughout the specification refers to a conventional word of text and to a delimiter such as a space, a period, a comma, a semi-colon and the like.

As will be described below in further detail, the system may iteratively reduce the size (measured in words) of the precursor in order to obtain a desired number of candidate words. For example, a three word precursor may have two corresponding candidate words. If the display has room for 10 words, the system may obtain additional candidate words by reducing the size of the precursor. A two word precursor may for example have four corresponding candidate words, and a one word precursor may have ten corresponding candidate words.

The system 10 includes at least one dictionary 110 including a list of candidate word entries; each candidate word entry includes an index and a candidate word. It should be understood that a given precursor may have many candidates. Thus, the same index may appear in multiple candidate word entries in the dictionary. For example the precursor "the" is likely to have many candidates. Each candidate word entry further includes a score indicative of the frequency of occurrence.

As will be explained below, the dictionary stored a plurality of candidate word entries. Each candidate word entry including an index, a candidate word, and a score. The size (measured in words) of the index may vary from entry to entry. Thus the dictionary may store candidate word entries having a one word index, and entries having a two word index, and entries having a three word index, etc. In this manner, the system may use a one word precursor or a two word precursor etc.

Optionally, the score may be a normalized number between 0 and 1.

Bi-Gram Embodiment

The method and system of the present invention will now be explained with reference to a bi-gram or two word embodiment in which the precursor is the immediately preceding word (or delimiter). In a tri-gram embodiment the precursor consists of the two immediately preceding words (or word/delimiter combination). Similarly, a four-gram embodiment the precursor consists of the three immediately preceding words. It should be understood that the teachings of the present invention may be implemented using any number of words in the precursor. The size of the index stored in the dictionary must correspond to the size of the precursor.

The dictionary 110 includes a plurality of candidate word entries; each candidate word entry includes an index, and a candidate word. The index is the key used to access the "candidate" word(s). It should be appreciated that a single precursor may have multiple candidate words. The index is at least one word or delimiter in length, but may consist of two or more words.

According to the bi-gram embodiment each candidate word entry in the dictionary 110 includes a list of two-word phrases in which the first word is termed the index and the second word is termed the "candidate" word. The precursor is the key or index used to access the "candidate" word(s). It should be appreciated that a single precursor may have multiple candidate words.

It should be appreciated that the precursor may be enlarged to include any number of words or delimiters. For ease of explanation the present example uses a one word precursor.

As noted above, each entry in dictionary 110 includes a score indicative of the frequency of occurrence, i.e. the frequency in which the user uses the phrase. A given precursor may have multiple candidate words, and the score associated with each candidate word may or may not be the same.

Each time the user enters (or selects) a precursor the system 10 searches the dictionary 110 for corresponding candidate words. The system 10 ranks the candidate words according to their score, and displays the first m number of candidate words in field 204.

Figure 5:
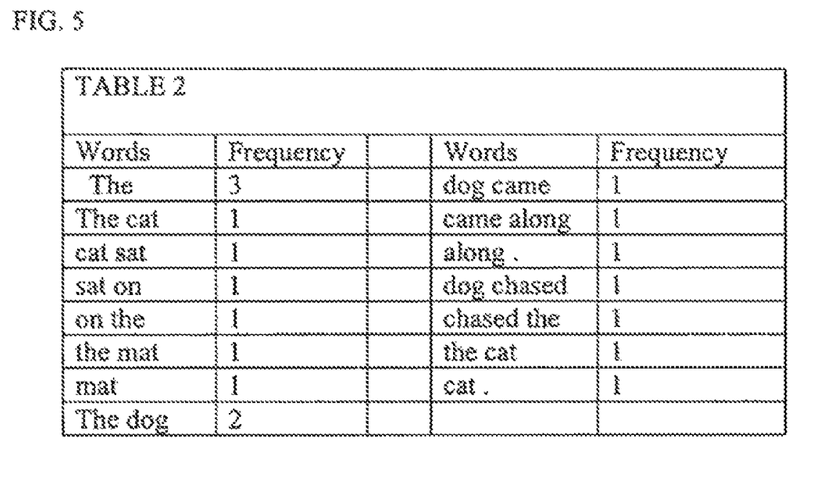
FIG. 5 is a table showing a two-word dictionary according to the present invention.

FIG. 5 below contains an illustrative list of two word phrases.

The system 10 may treat the initial state before any word has been entered in the same way it reacts when the precursor is a delimiter such as a period. In this manner the system 10 may be configured to provide candidate words in the initial state before the user has entered a first character of the text.

The system 10 may be self-training in the sense that new phrases and their corresponding scores may be dynamically added to the dictionary 110. Moreover, the score of existing phrases may dynamically update to reflect changes in the frequency of usage.

According to a preferred embodiment, the system 10 is provided with a robust dictionary 110 such that the full benefit of the system is immediately available to the user. Moreover, if the system 10 permits the score of existing phrases to dynamically update then the dictionary 110 will self-optimize to reflect the style, diction, and vocabulary of the user. Thus, even if the dictionary 110 is initially empty, the system 10 will compile its own dictionary reflective of the user's vocabulary, diction and style.

An initial dictionary 110 may be compiled by examining a body of text for x-word phrases, and ranking the frequency of the x-word phrases. In the bi-gram embodiment of the present example x will equal to 2.

Ideally the body of text used to compile the dictionary will contain a rich vocabulary and varied examples of style and diction.

The system 10 is especially useful for languages for which it is complex to input words, e.g. Chinese. The system 10 may thus operate on full symbols or on morphemes (one or more morphemes make up a word of a language) or even on syllables (e.g. Hiragana or Katakana in Japanese).

In the preceding example, the precursor was the immediately preceding word (or delimiter). However, one of ordinary skill in the art will appreciate that the invention may be readily adapted to select one or more candidate words using any size of precursor, e.g. a two or three word precursor.

In the aforementioned example, the candidate words were generated using the score associated with each dictionary entry, where the score is indicative of the frequency and is statistically generated.

Figure 7:
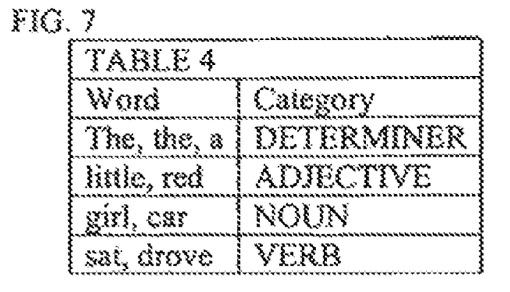
FIG. 7 is a table used to decode a word of text into a grammatical representation.
Figure 8:
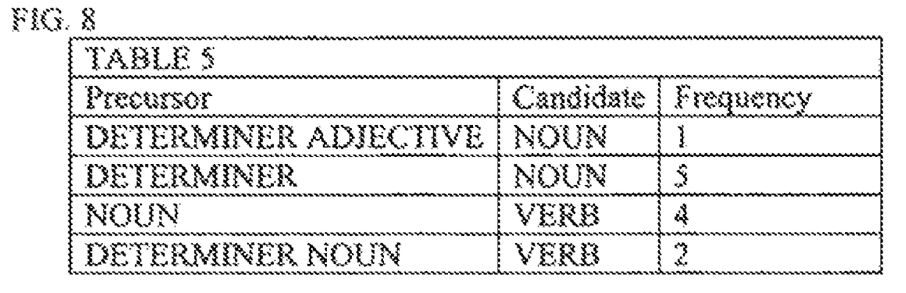
FIG. 8 is a table used to determine a candidate word using a grammatical representation.

However, the candidate list can also be generated using grammatical rules. For example, if the system 10 has identified a context in which only a verb can follow, all nouns will be excluded from the candidate list. If for example, one of the dictionaries (c.f. to FIG. 7 as an example) is extended to have word classes such as DETERMINER, ADJECTIVE, VERB, NOUN, etc. (these words are capitalised to reflect the word class and not the word itself) associated with words, then the precursor may be defined as a string of word classes. For example, one precursor may be "DETERMINER ADJECTIVE" and have "NOUN" as candidate. In this way, the phrases "the red car" and "a little girl" may be realized within one entry. The table in FIG. 7 is an example for a dictionary that maps words into their respective categories. The corresponding dictionary used to predict candidates from the preceding context is given in FIG. 8. FIG. 8 is also an example of varying sizes of context used for determining the precursor. While there is a rule that predicts a NOUN after a DETERMINER, there is also a rule that predicts a NOUN after a DETERMINER followed by an ADJECTIVE. This rule would predict "car" and "girl" after "a little". To determine a precursor, even more complex analyses may be performed rather than a mere mapping of word forms to word classes as is described below.

FIG. 7 provides a mapping mechanism for translating words into their respective classes. Such a translation table is a very simple mechanism of computing word classes from word forms. Other grammatical predictions based on more complex linguistic analyses of the context (rather than just mapping words to word classes) may be readily adapted to generate the candidate list. It is noteworthy, that the grammatical information need not be constrained to the word class. Additionally inflectional information maybe used (such as number: plural/singular, case: nominative/accusative, etc.) to further specify the grammatical information of the words. In this way $NOUN_{SING, NOM}$ (denoting a noun in singular, nominative) may specify the word "girl", but not the word "girls" (as this word is the plural form and would correspond to $NOUN_{PLUR, NOM}$). Rule based prediction for this precursor having the rule "precursor: $NOUN_{SING, NOM}$, candidate: $VERB_{SING, NOM}$", where $VERB_{SING, NOM}$ denotes a verb in singular, nominative, would prevent the candidate "wants" for the precursor "girls", but would allow the verb for the precursor "girl".

Also the translation of a grammatical precursor into a grammatical candidate class may be realized in more complex and algorithmic ways than the simple table that is given in FIG. 8. For example, a set of rules maybe iteratively or recursively applied before using the grammatical representation of the text just as a precursor.

A simple grammatical prediction system would generate the candidate list in the following way: first, translate the text written already into a grammatical representation (for example using table 4 given in FIG. 7). Next match the last n grammatical representations against the precursors in the table 5 (FIG. 8) and determine the candidate. Finally, translate the candidate back to word forms using table 4 (in FIG. 7).

It is noteworthy that several rules could match the grammatical context. In this case, the list of candidates may be constructed by combining the candidates resulting from the various matches.

In this version of predicting the text, the prediction was made using grammatical information (FIG. 7) and grammatical rules (FIG. 8) instead of statistical information. Of course, these two methods may be combined in order to obtain even better prediction. For example, the words in table 4 may have additional information about the frequency of use. In this way, a ranking of the candidates within one grammatical category may be obtained.

Generally speaking, the invention provides two methods for inputting a word of text. First, the user can type in words, character-by-character, using the keyboard. Second, the user may select a displayed candidate word. It should be understood that reference to typing in a word includes any method of entering text.

As noted above, the system may provide one or more candidate words in the initial state before the user has provided a precursor.

According to a further refinement of the present embodiment, the system may refresh or update the candidate list in response to character(s) entered by the user. More particularly, the system responds to the user's entry of the first letter of the desired word by displaying only those candidate words whose initial letter corresponds to the entered letter. In this case the candidate words are selected in accordance with the precursor and the characters entered by the user.

It is important to appreciate that the aforementioned refinement is significantly different from the prior art disambiguation methods described in the background of the invention. The prior art methods simply lookup words in a conventional alphabetic dictionary whose initial letter(s) correspond to those entered by the user. Since the conventional dictionary is not context driven, the system will display words which do not fit the context. In fact the system will respond with the same list of words each time the user enters a given letter, regardless of the context.

In contrast, the present invention selects candidate words based on the context (precursor). The list of candidate words are ordered according to the score and only the first m words are displayed. The aforementioned refinement narrows the list of candidate words by selecting only those candidate words whose initial letter(s) correspond to those entered by the user. Thus the refinement makes the score a secondary sort key rather than the primary key. Most importantly, the present system will provide suggestions for words following the word just entered. Thus, there will be candidates for the next word although no key stroke has occurred. None of the prior art has claimed such an ability. Prior art only assists the user complete the current word. The present invention predicts the word following the current word.

In the simplest case, the score mentioned above may be the frequency of use.

Optionally, the processor will dynamically adjust the size of the precursor to ensure that the system obtains a desired number of candidate words. Thus, if the system retrieves too few candidate words it can dynamically reduce the size (in words) of the precursor. Alternatively, if the processor retrieves too many candidate words it can dynamically increase the size (in words) of the precursor. In other words, if the number of candidate words retrieved is a threshold number of words greater than the number of words which may be displayed on the screen then the processor can dynamically increase the size of the precursor. Using our example, the processor may shift from a bi-gram which uses a one word precursor to a tri-gram which uses a two word precursor, i.e. the two words which immediately precede the word to be entered.

Optionally, the dictionary 110 may include a list of individual words (candidate words without an associated precursor) and their respective score in addition to the aforementioned x-word phrases. These single word entries will be termed orphan words. As will be explained below, these orphan words are used to supplement the candidate words when the number of candidate words falls below a pre-defined threshold number. For example, if there is only one candidate word for a given precursor, the system 10 may display one or more of the orphan words.

The embodiments and refinements discussed above were explained with reference to a single dictionary 110. However, the present invention may be implemented using multiple dictionaries 110 without departing from the scope of the invention. For example, a first dictionary 110 may be used to store single word (one-gram) entries and their respective scores, and a second dictionary 110 may be used to store two-word (bi-gram) phrases and their respective scores. Alternatively, the system 10 may include a fixed, pre-defined dictionary 110 and a user-defined dictionary 110. Thus the concept of the invention may be extended to include any number of dictionaries. Also, as mentioned above, different dictionaries may be used for different receiving applications or different text fields.

As computing power is generally limited in portable devices it may be useful to keep the dictionaries 110 in different tables. Generally, a one-gram table/dictionary will be smaller than a bi-gram dictionary and thus can be searched faster. However implementation details do not change the scope of the invention and one of ordinary skill in the art will appreciate that there are different possibilities to implement the dictionaries and their access. For example the mapping from precursor to candidates may not be realised through an index, but may arise from a more complex computation. This may be the case for predictions based on grammar.

One method for calculating the score for a dictionary will now be explained with reference to the following example. Consider the following text:

"The cat sat on the mat. The dog came along. The dog chased the cat."

Dictionary Build Up:

Generally, the text is pre-processed, to include a leading delimiter such as a period as the first character. Moreover, a space is inserted between words and delimiters (periods, commas and the like) in order to isolate the delimiters.

Afterwards, the above sentence would read:

". The cat sat on the mat. The dog came along. The dog chased the cat."

For building up a one-word (one-gram) dictionary, the words and their frequency are counted. In the present example, different word cases (differences in capitalization) are treated as different words, i.e. "The" and "the" would be to different words.

Figure 4:
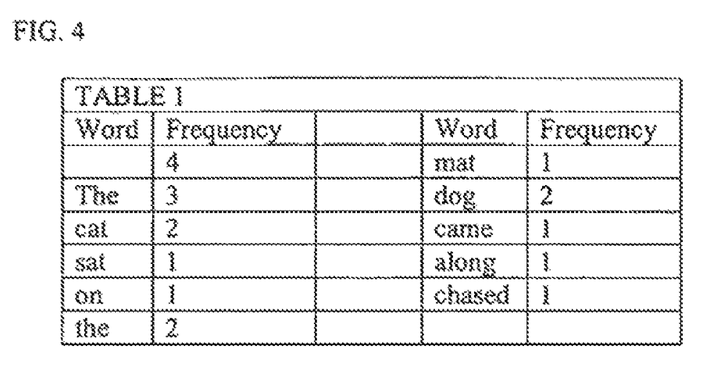
FIG. 4 is a table showing a one-word dictionary according to the present invention.

Table 1 (FIG. 4) shows the one-word dictionary for the example text.

For building up a two-word (bi-gram) dictionary, combinations of two words and/or delimiters are used as entries for the dictionary (c.f. Table 2, FIG. 5).

It is apparent from FIG. 5 (Table 2) that for bi-gram frequencies, the text corpus used for training must be larger to get better estimates of the frequencies. Here, most frequencies have the value of one. Correspondingly for a tri-gram frequency in which the precursor is two words the text corpus used for training must be even larger still to get better estimates of the frequencies.

Initial Word Candidates:

As described above, the system 10 may be configured to present a list of candidate words in the initial state before the user has entered a precursor. In the preferred embodiment these candidate words are generated by looking at bi-grams, where the precursor is in fact a period. Using the bi-gram dictionary above, the only candidate: is "The", as there is only one bi-gram entry in the dictionary starting with the period, namely ". The".

Obviously, it is desirable to have a full complement of candidate words in order to provide a reasonable number of selections from which to choose. According to one embodiment, any empty slots in the candidate list may be filled by orphan (one-gram) words in decreasing order of frequency. Words that already appeared due to bi-gram frequencies will be excluded from the fill-up items.

In an initial state which assumes a precursor ".", the following eight item candidate list may be selected using the one-gram and bi-grams (FIGS. 4 and 5): "The. cat the dog sat on mat" The first candidate "The" is selected from Table 2 using the precursor ".". However, since FIG. 5 does not contain any other candidates for the precursor ".", the remaining seven words are selected from the orphan word dictionary (one-gram) FIG. 4 (Table 1) according to their score.

Entering Text Using Candidates Only:

Continuing with the previous example let us assume that the user selects the candidate word "The" and this word is then displayed in the text output field 202. The system 10 now makes "The" the precursor and selects a new list of candidates. The two obvious candidates from the bi-gram dictionary given in table 2 would be "cat" and "dog". As "The dog" has the frequency 2, it will rank higher after sorting. Again, the rest of the list would be filled up by orphan (one-gram) words.

The new list presented in field 204 to the user would thus read like: "dog cat. The sat on mat". The user could now choose the word "sat". The only item in the bi-gram dictionary would then be "on", and so on.

Entering Text Using Candidates and Keyboard:

According to the aforementioned hypothetical, on start-up, the system 10 generates the following initial candidate: "The. cat the dog sat on mat". If the user enters a character instead of selecting a candidate word, for example the character "t", then the system filters out all words from the candidate list that do not begin with the letter "t" independent of the capitalization of the candidate words. In the present situation, there would only remain two words that make up the reduced list: "The the". Again, the residual positions would be filled up by orphan (one-gram) words, in the present case (i.e. the present dictionaries in Tables 1 and 2) however, there are none.

Constructing a User Dictionary:

According to one refinement, the system 10 adapts to the user's style by tracking the words that the user enters by building up X-gram and one-gram frequencies, where X is any integer value greater than 1. The X-gram and one-gram frequencies may all be stored in a single dictionary 110. However, according to a preferred embodiment, one dictionary 110 contains pre-defined X-gram and one-gram frequencies and another dictionary 110 stores user-defined X-gram and one-gram frequencies. The user-defined X-gram and one-gram frequencies will be different in their distribution from the pre-defined dictionary(s) 110 which were computed from a different corpus of text. The text corpus may, for example, include newspapers, stories, etc. and will thus differ from the user's style. The text corpus used to construct the pre-defined X-gram and one-gram frequencies may be very large compared to the user's inputs. Consequently the frequencies of the respective dictionaries 110 may need to be normalized to the overall size of the corpora and combined to have a reflection of the user's writing style in the candidate list.

Figure 6:
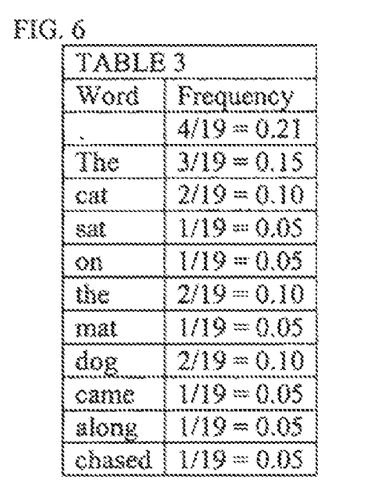
FIG. 6 is a table showing normalization of the one-gram dictionary of FIG. 4.

Normalization of the one-gram dictionary (Table 1, FIG. 4) will result in Table 3 (FIG. 6). Please note that the summed frequency which by definition equals the overall size of the corpus of the words is 19.

Note that, due to a division by a constant factor, the order of frequencies remains the same. Note also, that all values range between 0 and 1. Such normalization would be computed for all dictionaries. Thus, independent of their size and absolute frequencies, they would contain words with frequencies ranging from 0 to 1. When computing the combined score by which candidates are ranked, now there would be a 1:1 influence between two dictionaries on the ranking.

In the present embodiment, the score is computed for a candidate word in the by the normalized frequency of the delivered dictionary plus the normalized frequency of the user dictionary times a scaling factor. The scaling factor accounts for the stronger influence one would want to give to the user dictionary. However, different formulae may be used to compute the overall scores used for ranking the candidate words.

The normalization and computation of the score is analogous for the bi-gram dictionaries.

Also, more than two dictionaries may be used for computing the score. The procedure would be analogous to the aforementioned procedure.

Although examples of an electronic device utilizing an efficient context-related data entry method and its use have been described and illustrated in detail, it is to be understood that the same is intended by way of illustration and example only and is not to be taken by way of limitation. The invention has been illustrated in the context of a cellular telephone and personal digital assistant. However, the data entry system may be used in a data entry application. Accordingly, variations in and modifications to the system and its use will be apparent to those of ordinary skill in the art, and the following claims are intended to cover all such modifications and equivalents.

The invention claimed is:

1. An apparatus comprising a processor and a memory storing a computer program, the memory and computer program being configured to, with the processor, cause the apparatus to at least:

receive text input data;

cause the text input data to be displayed;

cause a precursor to be defined as one or more words;

reference a dictionary containing a plurality of entries, each said entry including an index, and a candidate word;

select a list of n-number of candidate words from said dictionary whose index matches the precursor, where n≧1;

either:

in an instance in which m>n and the precursor comprises two or more words:

cause n-number of candidate words from said list of candidate words to be displayed, cause the precursor to be shortened by causing one or more words to be deleted from the precursor, select a supplemental list of candidate words from said dictionary whose index matches the shortened precursor, and cause m−n number or less of said supplemental candidate words to be displayed;

or, in an instance in which n>m:

cause the precursor to be lengthened by causing one or more words to be added to the precursor, select an alternate list of candidate words from said dictionary whose index matches the lengthened precursor, and cause m-number or less of candidate words from the alternate list to be displayed;

and cause a prompt to be displayed, the prompt enabling a user to either select one of the displayed candidate words or enter a desired word;

wherein m comprises a maximum number of candidate words capable of being caused to be displayed.

2. The apparatus according to claim 1, wherein said apparatus is caused to, in an initial state, before receiving any text entry, causing the precursor to be initialized by defining the precursor as a predefined word.

3. The apparatus according to claim 2, wherein the predefined word is "." (a period).

4. The apparatus according to claim 1, wherein the dictionary comprises a pre-defined x-gram dictionary compiled by examining a body of text for x-word phrases, x being an integer greater than 1.

5. The apparatus according to claim 1, wherein the dictionary comprises a fixed pre-defined dictionary and a user-defined dictionary.

6. The apparatus according to claim 1, wherein said apparatus is further caused to define the precursor as the candidate word or desired word selected or entered by the user and cause a new list of candidate words corresponding to the updated precursor to be displayed.

7. The apparatus according to claim 1, wherein:
said precursor is greater than one word in length, and
the apparatus is further caused to, in response to the selection of a candidate word:
cause the precursor to be updated by causing the selected candidate word to be appended to the end of the precursor and causing the leading word to be deleted,
select a new list of candidate words whose index matches the updated precursor, and
cause m-number or less of candidate words from the new list of candidate words to be displayed.

8. The apparatus according to claim 1, wherein said dictionary further contains at least one score respectively associated with at least one of the plurality of entries, and further wherein the apparatus is further caused to cause said m-number of candidate words to be displayed in an order corresponding to their respective score.

9. The apparatus according to claim 1, wherein:
said dictionary further contains at least one score respectively associated with at least one of the plurality of entries; and,
in an instance in which m is less than n the apparatus is further caused to cause the m-number of candidate words having the highest score from said list of candidate words to be displayed.

10. The apparatus according to claim 1, wherein said dictionary further contains at least one score respectively associated with at least one of the plurality of entries, and said apparatus is further caused to periodically cause the score of the at least ones of said candidate words to be updated to reflect a frequency of usage.

11. The apparatus according to claim 1, wherein said apparatus is further caused to, in an instance in which a match between at least one said index stored in said dictionary and said precursor does not exist, cause a new entry to be created in said dictionary, the index of the new entry being said precursor and the candidate word of the new entry being the desired word entered by the user.

12. The apparatus according to claim 1, wherein the apparatus is further caused to, in an instance in which the user enters a character of the desired word instead of selecting one of the displayed candidate words, cause to be filtered out of the displayed candidate words, all candidate words not beginning with the entered character independent of a capitalization of the displayed m-number of candidate words.

13. The apparatus according to claim 1, wherein said dictionary further contains at least one score respectively associated with at least one of the plurality of entries; and wherein said apparatus is caused to cause only candidate words whose score exceeds a threshold value to be displayed.

14. A method comprising:
causing a precursor to be defined as one or more words;
receiving text input data;
causing the text input data to be displayed;
referencing a dictionary containing a plurality of entries, each said entry including an index and a candidate word;
selecting, from the dictionary, a list of n-number of candidate words whose index matches the precursor, where $n \geq 1$;
either:
in an instance in which m>n and the precursor comprises two or more words:
causing n-number of candidate words from said list of candidate words to be displayed,
causing the precursor to be shortened by causing one or more words to be deleted from the precursor,
selecting a supplemental list of candidate words from said dictionary whose index matches the shortened precursor, and
causing m−n number or less of said supplemental candidate words to be displayed;
or, in an instance in which n>m:
causing the precursor to be lengthened by causing one or more words to be added to the precursor,
selecting an alternate list of candidate words from said dictionary whose index matches the lengthened precursor, and
causing m-number or less of candidate words from the alternate list to be displayed;
and causing a prompt to be displayed, the prompt enabling a user to either select one of the displayed candidate words or enter a desired word;
wherein m comprises a maximum number of candidate words capable of being caused to be displayed.

15. The method according to claim 14, further comprising, in an initial state, before receiving any text input data causing the precursor to be initialized by causing the precursor to be defined as a predefined word.

16. The method according to claim 14, wherein the predefined word is a "." (a period).

17. The method according to claim 14, wherein the dictionary comprises a pre-defined x-gram dictionary compiled by examining a body of text for x-word phrases, x being an integer greater than 1.

18. The method according to claim 14, wherein said dictionary further contains at least one score respectively associated with at least one of the plurality of entries; and wherein causing said candidate words to be displayed comprises causing said candidate words to be displayed in an order corresponding to their respective score.

19. The method according to claim 14, wherein the precursor is greater than one word in length, the method further comprising:
in response to the selection of a candidate word:
causing the precursor to be updated by causing the selected candidate word to be appended to the end of the precursor and causing the leading word to be deleted from the precursor;
selecting a new list of candidate words whose index matches the updated precursor; and
causing m-number or less of candidate words from the new list of candidate words to be displayed.

20. The method according to claim 14, wherein said dictionary further contains at least one score respectively associated with at least one of the plurality of entries and further comprising causing the at least one score to be updated to reflect a frequency of usage.

21. The method according to claim 14, further comprising, in an instance in which a match between at least one said index stored in said dictionary and said precursor does not exist, causing a new entry to be created in said dictionary, the index of the new entry being said precursor and the candidate word of the new entry being the desired word entered by the user.

22. The method according to claim 14, further comprising, in an instance in which the user enters a character of the desired word instead of selecting one of said displayed candidate words, cause to be filtered out of the displayed candidate words, all candidate words not beginning with the entered character independent of a capitalization of the displayed candidate words.

23. A computer program product comprising a non-transitory computer-readable medium storing program code configured to, upon execution, cause an apparatus comprising a processor to perform the method according to claim 14 when the program code is executed by the processor.

24. A device, comprising:
a display screen configured to display m-words of data;
a text entry device configured to enter data;
an apparatus operably connected to the display screen and text entry device and comprising a processor and a memory storing a computer program, the memory and computer program being configured to, with the processor, cause the apparatus to at least:
  receive data from the text entry device and cause it to be displayed on the display screen;
  cause a precursor to be defined as one or more words;
  reference a pre-defined x-gram dictionary containing a plurality of entries, where x≧2, each said x-gram dictionary entry including an index, a candidate word and a score;
  select a list of n-number of candidate words from said dictionary whose index matches the precursor, where n≧1; and
  cause m-number of candidate words from said list of candidate words to be displayed on said display screen, where m>1;
either:
  in an instance in which m>n and the precursor comprises two or more words:
    cause n-number of candidate words from said list of candidate words to be displayed on the display screen,
    cause the precursor to be shortened by causing one or more words to be deleted from the precursor,
    select a supplemental list of candidate words from said dictionary whose index matches the shortened precursor, and
    cause m−n number or less of said supplemental candidate words to be displayed on the display screen;
  or, in an instance in which n>m:
    cause the precursor to be lengthened by causing one or more words to be added to the precursor,
    select an alternate list of candidate words from said dictionary whose index matches the lengthened precursor, and
    cause m-number or less of candidate words from the alternate list to be displayed on the display screen;
  cause a prompt to be displayed on the display screen, the prompt enabling a user to select one of the displayed candidate words or enter a desired word using said text entry device; and
  wherein m comprises a maximum number of candidate words capable of being caused to be displayed on the display.

25. The device according to claim 24, wherein said apparatus is further caused to, in an initial state, before entry of any character in said text entry device, cause the precursor to be initialized by causing the precursor to be defined as a predefined word, and further wherein the apparatus is caused to cause said list of n-number of candidate words to be displayed before the user has entered a precursor.

26. The apparatus of claim 1, wherein the index and precursor comprise one or more word classes and further wherein the apparatus is caused to select a list of n-number of candidate words from said dictionary whose index matches the precursor by selecting a list of n-number of candidate words from said dictionary whose index matches the precursor according to one or more grammatical rules.

27. The method of claim 14, wherein the index and precursor comprise one or more word classes and further wherein selecting a list of n-number of candidate words from said dictionary whose index matches the precursor comprises selecting a list of n-number of candidate words from said dictionary whose index matches the precursor according to one or more grammatical rules.

* * * * *

UNITED STATES PATENT AND TRADEMARK OFFICE
CERTIFICATE OF CORRECTION

PATENT NO. : 8,374,850 B2
APPLICATION NO. : 13/229769
DATED : February 12, 2013
INVENTOR(S) : Assadollahi Page 1 of 1

It is certified that error appears in the above-identified patent and that said Letters Patent is hereby corrected as shown below:

Title page.
Item (75), Inventor: "Constance (DE)" should read --Konstanz (DE)--.

In the Claims

Column 11,
Line 35, "at least ones" should read --at least one--.

Column 12,
Line 25, "text input data causing" should read --text input data, causing--.

Signed and Sealed this
Twenty-seventh Day of August, 2013

Teresa Stanek Rea
*Acting Director of the United States Patent and Trademark Office*